United States Patent
Vierkoetter

(10) Patent No.: US 11,585,747 B2
(45) Date of Patent: Feb. 21, 2023

(54) CUVETTE, PREFERABLY FLOW-THROUGH CUVETTE FOR AN OPTICAL MEASURING DEVICE, AND METHOD FOR ITS OPERATION

(71) Applicant: Endress+Hauser Conducta GmbH+Co. KG, Gerlingen (DE)

(72) Inventor: Axel Vierkoetter, Renningen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 210 days.

(21) Appl. No.: 16/683,522

(22) Filed: Nov. 14, 2019

(65) Prior Publication Data
US 2020/0158627 A1  May 21, 2020

(30) Foreign Application Priority Data
Nov. 15, 2018 (DE) .................. 10 2018 128 723.2

(51) Int. Cl.
*G01N 21/05* (2006.01)
*G01N 21/03* (2006.01)
*B01L 3/00* (2006.01)

(52) U.S. Cl.
CPC ......... *G01N 21/05* (2013.01); *G01N 21/0332* (2013.01); *B01L 3/502* (2013.01)

(58) Field of Classification Search
CPC .... G01N 21/05; G01N 21/0332; G01N 21/15; G01N 21/85; G01N 21/03; G01N 27/07; G01N 27/26; G01N 21/00; G01N 2021/0325; G01N 2021/155; B01L 3/502; G01K 13/00

USPC .......................................... 422/554
See application file for complete search history.

(56) References Cited

U.S. PATENT DOCUMENTS

| | | | |
|---|---|---|---|
| 3,811,841 A | 5/1974 | Kassel | |
| 4,083,638 A * | 4/1978 | Sandrock | B01F 13/002 356/246 |
| 4,462,962 A | 7/1984 | Baba et al. | |
| 5,995,209 A | 11/1999 | Öhman et al. | |
| 6,150,148 A * | 11/2000 | Nanda | C12M 35/02 435/173.6 |
| 2007/0077177 A1* | 4/2007 | Witt | G01N 21/05 422/82.05 |
| 2009/0209017 A1* | 8/2009 | Ragsdale | C12N 13/00 435/173.6 |
| 2009/0257918 A1* | 10/2009 | Endo | G01N 21/0303 422/68.1 |
| 2010/0035322 A1* | 2/2010 | Raffa | A61N 1/327 435/173.7 |

(Continued)

FOREIGN PATENT DOCUMENTS

| | | |
|---|---|---|
| CN | 2713463 Y | 7/2005 |
| CN | 204882358 U | 12/2015 |

(Continued)

*Primary Examiner* — Benjamin R Whatley
*Assistant Examiner* — Jacqueline Brazin
(74) *Attorney, Agent, or Firm* — Mark A. Logan; Endress+Hauser (USA) Holding, Inc.

(57) ABSTRACT

A cuvette for arrangement in an optical measuring device includes a receiving chamber for a measuring medium having an inlet. The receiving chamber is delimited at least in some regions by two opposing plane-parallel side surfaces. Two opposing metallic electrodes are arranged in the receiving chamber on the opposing side surfaces.

3 Claims, 4 Drawing Sheets

(56) References Cited

U.S. PATENT DOCUMENTS

| | | | | |
|---|---|---|---|---|
| 2011/0136164 A1* | 6/2011 | Calatzis | ............. | G01N 33/4905 |
| | | | | 435/29 |
| 2011/0314907 A1* | 12/2011 | Wiedekind-Klein | ....................... | |
| | | | | G01F 23/268 |
| | | | | 73/304 C |
| 2016/0103089 A1 | 4/2016 | Boyette et al. | | |
| 2018/0172615 A1* | 6/2018 | Lau | ....................... | G01N 27/286 |
| 2019/0143330 A1* | 5/2019 | Kanda | ....................... | B01L 3/52 |
| | | | | 435/287.3 |
| 2021/0041472 A1* | 2/2021 | Limbach | .............. | G01N 21/253 |

FOREIGN PATENT DOCUMENTS

| | | | |
|---|---|---|---|
| DE | 102010025118 | A1 | 12/2011 |
| DE | 102011005807 | A1 | 9/2012 |
| DE | 112012001898 | B4 | 11/2016 |
| WO | 2007049611 | A1 | 5/2007 |
| WO | 2018077449 | A1 | 5/2018 |

* cited by examiner

CUVETTE, PREFERABLY FLOW-THROUGH CUVETTE FOR AN OPTICAL MEASURING DEVICE, AND METHOD FOR ITS OPERATION

CROSS-REFERENCE TO RELATED APPLICATION

The present application is related to and claims the priority benefit of German Patent Application No. 10 2018 128 723.2, filed on Nov. 15, 2018, the entire contents of which are incorporated herein by reference.

TECHNICAL FIELD

The present disclosure relates to a cuvette, preferably a flow-through cuvette for a measuring device.

BACKGROUND

Optical measuring methods have become established in process analysis measuring technology. In this case, the measuring medium can be mixed with one or more reagents, possibly heated and then poured into a glass cuvette.

There the substance to be analyzed reacts with the reagent, resulting in a color change, depending on its concentration. This color change is detected by means of an optical measuring method. However, an addition is not absolutely necessary with other optical measuring methods.

Cuvettes, including glass cuvettes, are often used in the prescribed field of application.

For further analysis parameters of the medium such as temperature, conductivity or pH, dedicated measuring points and fittings are provided for the necessary sensors in the tubing or piping of the analysis device.

Separate external sensors may also be used for process reliability in filling and emptying the cuvettes.

In order to avoid contamination within the cuvettes, normal analysis devices have cleaning cycles or a replacement of the cuvette is considered. The cuvette can be cleaned with clean water, and the zero values then determined can be offset against the actual measured values in order to compensate for contamination.

SUMMARY

Starting from the above-described preliminary consideration, the present disclosure is based on the object of providing a cuvette which makes it possible to combine a plurality of measurement methods in a compact manner, such as cuvettes which are necessary for determining parameters for the qualitative or quantitative determination of an analyte in a measuring medium.

A cuvette according to the present disclosure for arrangement in an optical measuring device comprises a receiving chamber for a measuring medium having an inlet, wherein the receiving chamber is delimited at least in some parts by two opposing plane-parallel side surfaces.

Two opposing metallic electrodes are arranged in the receiving chamber on opposite side surfaces. The electrodes allow signal tapping within the cuvette.

The arrangement of the electrodes enables a two-point conductivity measurement. Depending on the arrangement of the electrodes, it is additionally or alternatively possible to ensure monitoring of the filling state and/or the emptying of the cuvette. The electrodes are preferably made of metal.

The cuvette according to the present disclosure can be used in various measuring devices, such as in a spectroscope, in a colorimeter and/or in a polarimeter. All these measuring devices are based on optical measuring methods.

Advantageous embodiments of the present disclosure are described below.

The cuvette typically has a longitudinal axis, the electrodes being arranged, for example, in the upper or lower third of the cuvette. This may be advantageous when monitoring the filling state.

Alternatively, two opposing metallic electrodes are arranged in a first region of the longitudinal axis and two further opposing metallic electrodes are arranged in a second region of the longitudinal axis different from the first region. The first region corresponds, for example, to the upper half of the cuvette. The second region corresponds, for example, to the lower half of the cuvette. In an alternative embodiment, the first region covers 80% or 90% of the cuvette and the second region covers 20% or 10% of the cuvette.

"Top" or "upper" is to be understood as meaning that the inlet of the cuvette is arranged there. "Bottom" or "lower" is to be understood as meaning that the outlet or the bottom of the cuvette is arranged there.

In one embodiment, the cuvette extends along the longitudinal axis and the inlet and outlet, or bottom, are disposed along the longitudinal axis.

A cuvette according to the present disclosure may also be a receptacle. However, it may be advantageous if the cuvette is a flow-through cuvette with an outlet at an end of the cuvette opposite the inlet.

In each case two electrodes can be arranged in the inlet-end third of the cuvette and two electrodes can be arranged in the discharge-end third of the cuvette.

The cuvette may also have a receptacle for a temperature sensor which projects into the receiving chamber. The receptacle may in particular be formed from a thermally conductive material, for example a metal. In this arrangement, the thermal conductivity of the material of the receptacle is better than the remaining material of the cuvette.

The temperature sensor can preferably be a component part of the cuvette and be arranged within the receptacle and outside the receiving chamber. However, it is also possible for the temperature sensor to be subsequently arranged in an existing cuvette before it is inserted in the receptacle in the measuring device or be inserted in the receptacle of the cuvette only. The cuvette can also be retrofitted subsequently.

Furthermore, the cuvette may have an insertion opening for a pH sensor. The pH sensor may be a component of the cuvette, or the insertion opening may be the option for a placement of a pH sensor.

A measuring device according to the present disclosure is used for optical measurement as part of a qualitative and/or quantitative determination of an analyte in a measuring medium. The optical measurement can preferably take place colorimetrically, spectroscopically and/or polarimetrically.

The measuring device has a receiving region, such as a receiving shaft, for receiving a cuvette according to the present disclosure.

The receiving region, which may include the receiving shaft, can have contacts, e.g. plug contacts, spring contacts, clamping contacts and the like, which serve for contacting the metallic electrodes of the cuvette with a signal line for signal transmission of measurement signals tapped off at the electrodes of the cuvette to a measurement and/or evaluation unit within the measuring device. The measurement and/or evaluation unit can comprise a computing unit and a memory module in a manner known per se. In addition, the receiving region has, in a manner known per se, a light transmitter and a light receiver for the optical measurement.

The present disclosure further relates to a method for operating a measuring device according to the present disclosure, wherein the measuring device has at least one measuring mode for optical measurement, such as qualitative and/or quantitative determination of an analyte in a measuring medium, wherein the measuring device in a further operating mode also performs the following functions: filling-level monitoring of the cuvette; an emptying monitoring of the cuvette; conductivity measurement for determining the conductivity of the measuring medium and/or a pH measurement for determining the pH value of the measuring medium; and/or contamination monitoring of the cuvette.

The aforementioned operating modes can be executed simultaneously with the measuring mode or alternately with respect to the measuring mode. Only one of the operating modes or a plurality of the operating modes may be executed. Some operating modes require four electrodes, others may be implemented with two electrodes. If a plurality of operating modes is implemented, these can be executed at the same time or at different times.

The conductivity measurement can be performed, for example, as a two-pole conductivity measurement or as a four-pole conductivity measurement. Advantageously, the conductivity measurement and one of the aforementioned other operating modes are carried out.

The further operating mode can be used for compensation and/or evaluation of the values determined in the measuring mode. For example, a measured value determined in the measuring mode is only significant when the cuvette has a minimum degree of filling.

BRIEF DESCRIPTION OF THE DRAWINGS

Further advantages, features and details of the present disclosure will become apparent from the following description, in which one or more exemplary embodiments of the present disclosure are explained in more detail with reference to the drawings. The person skilled in the art will expediently consider individually the features disclosed in combination in the drawings, the description and the claims and combine them into meaningful further combinations.

Shown is the following.

DETAILED DESCRIPTION

The components of the respective cuvettes that are identical in the subsequent figures are provided with the same reference numbers.

Figure 1:
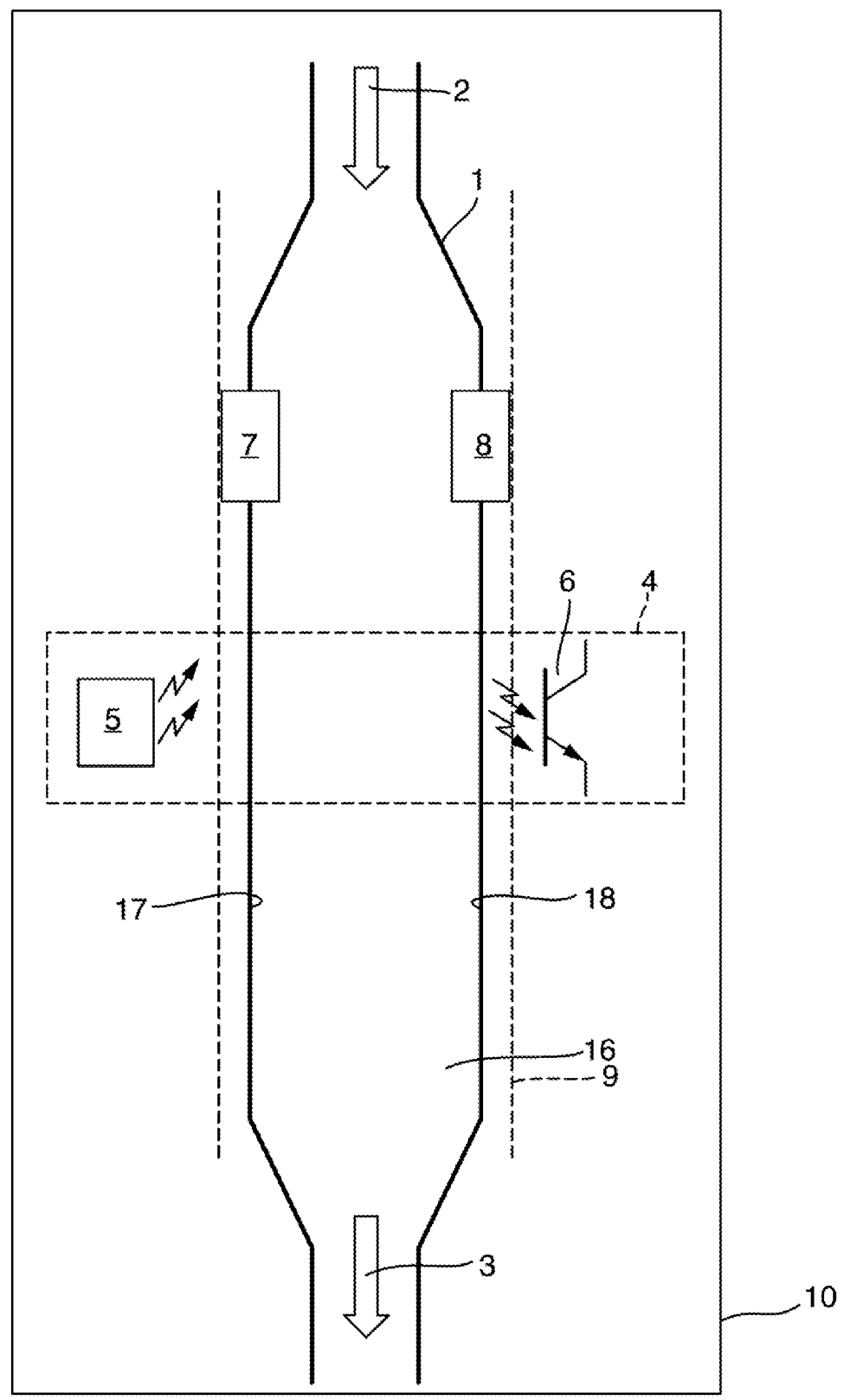
FIG. 1 shows a first variant of a cuvette according to the present disclosure.

FIG. 1 shows a cuvette 1 which in the present embodiment is designed as a flow-through cuvette. However, the present disclosure is not limited to a flow-through cuvette, or may be any other cuvette shape, e.g., having a terminal bottom.

In the embodiment as a flow-through cuvette, the cuvette 1 has a receiving chamber 16 for receiving the medium and an inlet 2 and an outlet 3. Furthermore, the cuvette 1 has a measuring region 4 in which the walls of the cuvette or at least their inner side surfaces 17 and 18 run plane-parallel to one another. Typical materials of which the cuvette may consist are, for example, plastic or glass, including quartz glass.

FIG. 1 further shows the housing of a measuring device for implementing an optical measuring method in which housing the cuvette 1 is arranged. The measuring device comprises a light source 5 as a signal transmitter and a light receiver 6 as a signal receiver.

The light emitted by the light source 5 and received by the light receiver 6, as well as the type of light source and possibly also the type of receiver, depends on the specific optical measurement method. Known measuring methods are, for example, ultraviolet, visual and infrared measurements with variable or fixed wavelength ranges. Other optical measuring methods may also be implemented within the scope of the present disclosure.

The optical measuring method and the corresponding optical measuring device may be used as an analyzer for qualitative and/or quantitative determination of constituents of a measuring medium, such as a solution.

In the upper inlet-end third, the cuvette 1 has at least one electrode 7, 8 for measuring conductivity. It can preferably be an arrangement of two electrodes which are arranged as electrode pairs along the two inner opposite plane-parallel side surfaces 17 and 18 of the cuvette 1. The arrangement of the two electrodes 7, 8 enables a two-pole conductivity measurement.

A particular electrode 7, 8 may have a preferred electrode area of at least 1 mm2. It can extend over the entire wall thickness of the particular cuvette wall to which the side surface is assigned, in order to enable signal tapping from the outer side of the cuvette. Along the inner side surface 17, 18 of said cuvette wall, the electrode 7, 8 can have, for better signal tapping, an expanded surface, for example in the form of a metallic coating. The metallic coating can be applied to the side surface by a customary application method, such as sputtering, and can be in contact with the further parts of the electrode 7, 8. On the outer side, the measuring device can have a contact tap at the height of the electrodes 7, 8. A preferred contact tapping can be effected, for example, by means of a spring contact pin with the respective outer-side electrode surface, so that an easy interchangeability of the cuvette 1 is possible, e.g., by pulling it out of a schematically indicated receiving shaft 9 of an optical, for example spectroanalytical, measuring device 10.

Conductivity measurement can be carried out with a direct voltage. A fill level can be determined on the basis of the conductivity. The degree of filling of the cuvette 1 illustrated can thus be taken into account in optical measurement.

Figure 2:
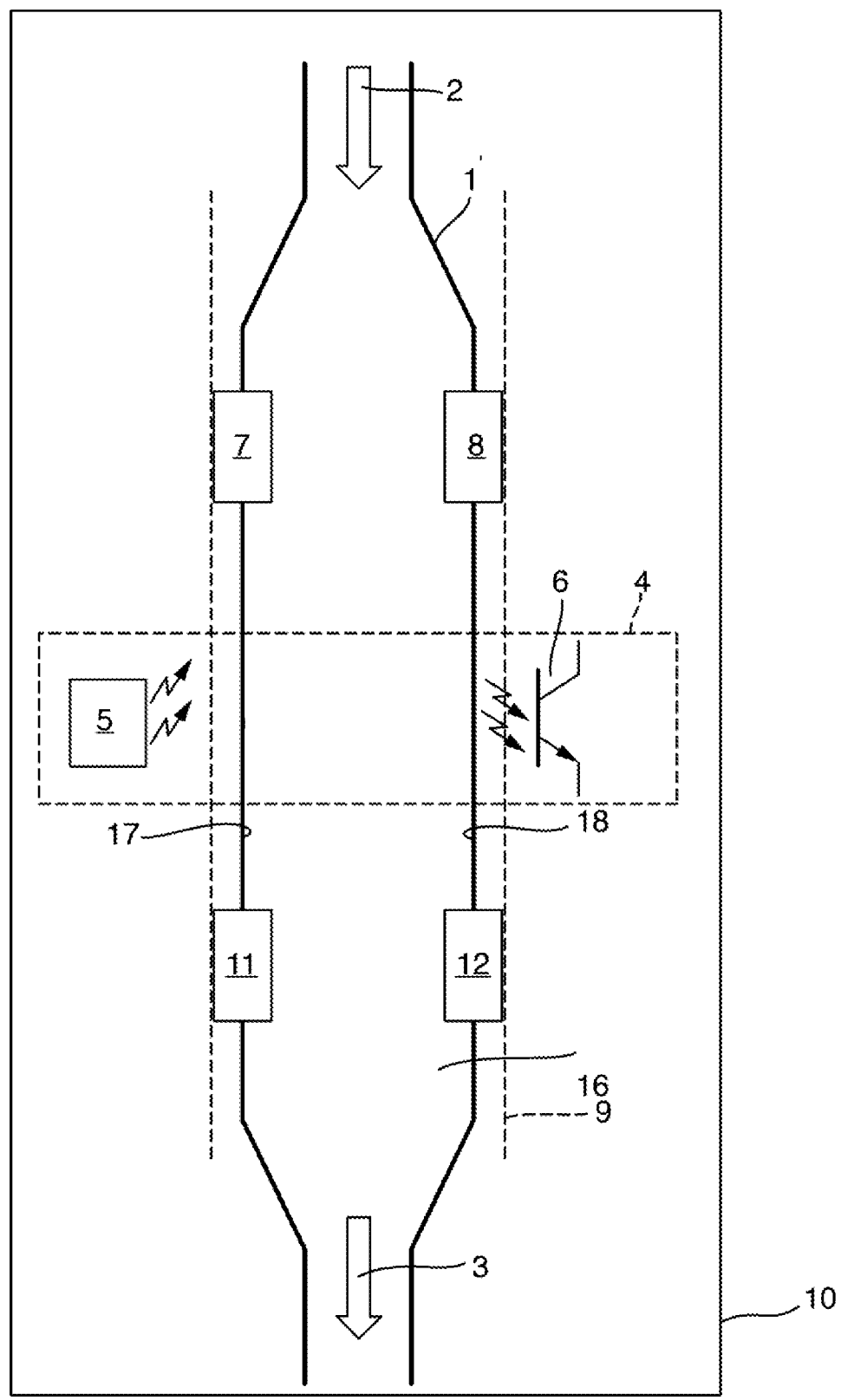
FIG. 2 shows a second variant of a cuvette according to the present disclosure.

FIG. 2 shows an expanded embodiment variant of a cuvette 1' according to the present disclosure supplemented by a further electrode pair with two electrodes 11 and 12.

The electrodes 11 and 12 are preferably arranged along the two inner opposite plane-parallel side surfaces 17, 18 of the cuvette 1' in a region in the outlet-end third of the cuvette 1'. The addition of the two electrodes 11, 12 enables a four-pole conductivity measurement. Four-pole conductivity measurement for the purposes of the present disclosure relates inter alia to a redundancy measurement of the electrodes 7, 8, 11, 12 arranged in pairs, so that, for example, incorrect measurements of one electrode pair, for example electrodes 7, 8, can be compensated for by the other electrode pair, for example, electrodes 11, 12.

The outlet-end electrodes 11, 12 may have the same geometry and the same electrode area as the inlet-end electrodes 7, 8.

It is possible for the inlet-end electrodes 7, 8 to be operated with a direct voltage and to monitor the fill level of the cuvette 1'.

On the other hand, the outlet-end electrodes 11 and 12 can be operated with an alternating voltage, so that the conductivity of the medium in the conductive measuring principle can be determined by a two-pole measurement.

An emptying monitoring can also be carried out by means of the electrodes 11 and 12, for example by performing a conductivity measurement with a direct voltage.

A contamination detection can be ensured by comparing the measured values of the inlet-end electrodes 7, 8 and/or electrode pairs to the outlet-end electrodes 11, 12 and/or electrode pairs. If an early contamination is detected, a cleaning cycle can be initiated, for example.

Figure 3:
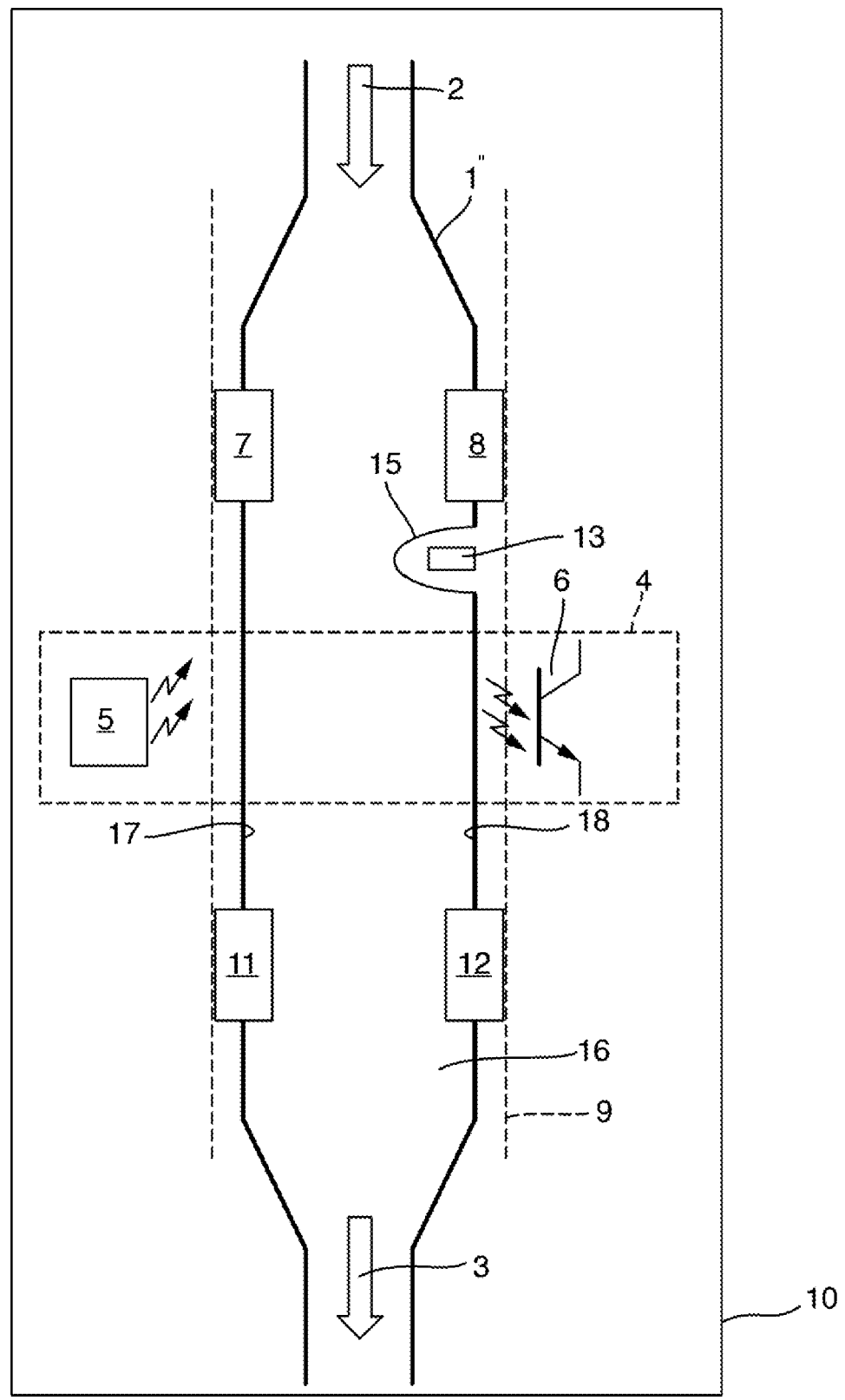
FIG. 3 shows a third variant of a cuvette according to the present disclosure.

FIG. 3 shows an expanded embodiment variant of a cuvette 1" according to the present disclosure supplemented by a temperature sensor 13.

For arranging the temperature sensor 13 in the flow path of the measuring medium, the cuvette 1" has a receptacle 15 for the temperature sensor 13 which projects into a receiving region of the cuvette 1".

The response times of the temperature sensor 13 depend inter alia on the thermal conductivity of the wall of the cuvette 1" in the region of the receptacle 15 since it must adjust to the temperature change.

In order to optimize the response times of the temperature sensor 13 in the event of a temperature change of the measuring medium, a reduction in the wall thickness of the cuvette 1" or a change in the wall thickness material of the cuvette 1" can be considered.

The temperature of the medium is another important factor, for example, in optical determination, such as, for example, qualitative and/or quantitative determination, of the composition or individual ingredients of the measuring medium.

Figure 4:
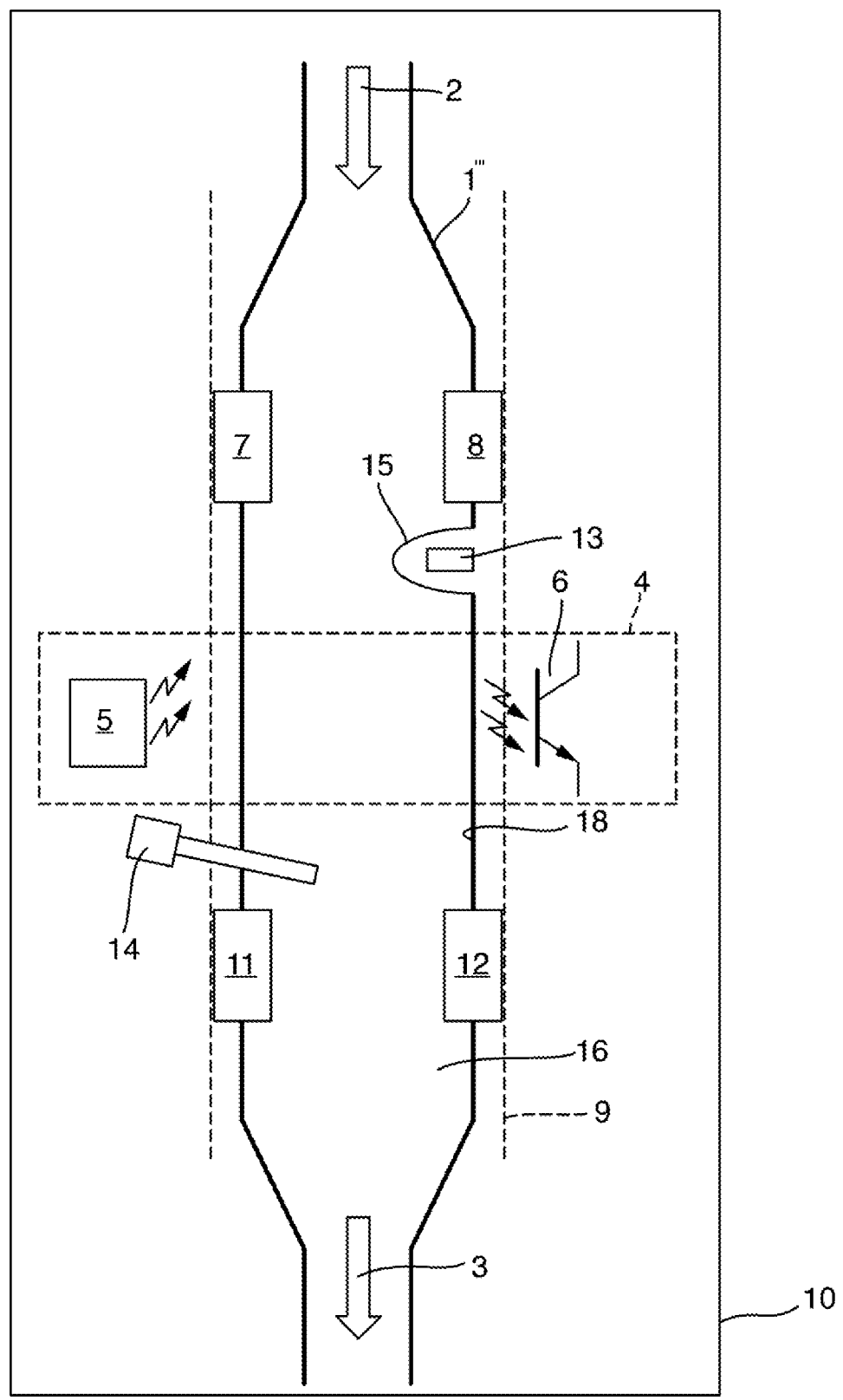
FIG. 4 shows a fourth variant of a cuvette according to the present disclosure.

FIG. 4 shows a further expanded embodiment variant of a cuvette 1'" according to the present disclosure supplemented by a pH sensor 14.

The pH sensor 14 determines the pH value of the solution. This can then be included in the end result of the conductivity measurement and/or of the optical measurement. In addition, inter alia, the temperature of the medium is also of importance for the pH measurement. Synergistic effects thus result in the integration of a plurality of the aforementioned sensors in a cuvette.

The pH sensor 14 can also be cleaned more frequently on the basis of the aforementioned contamination detection, depending on the type of medium.

The invention claimed is:

1. A method for operation of a measuring device having at least one measuring mode for optical measurement, the method including the steps of:
    providing a measuring device for optical measurement, the measuring device including:
        a receiving shaft for receiving a cuvette, the cuvette including:
            a receiving chamber for a measuring medium, the receiving chamber having an inlet and two opposing plane-parallel side surfaces; and
            a first pair of opposing metallic electrodes arranged inside the receiving chamber on the opposing side surfaces, each electrode extending through the respective side surface of the receiving chamber thereby enabling signal tapping of the respective electrode from outside the cuvette,
            wherein the cuvette is embodied to be removably inserted into the receiving shaft of the measuring device;
        the cuvette;
        a first pair of electrical contacts disposed in the receiving shaft, wherein each electrical contact is positioned to contact a respective electrode of the first pair of electrodes of the cuvette when the cuvette is in the receiving shaft; and
        a measurement and/or evaluation unit configured to receive and process measurement signals tapped off at the first pair of electrodes,
        wherein the measurement and/or evaluation unit is further configured to process the measurement signals to perform a conductivity measurement of a medium within the cuvette;
    filling the cuvette with a measuring medium;
    monitoring a filling-level of the cuvette;
    monitoring an emptying of the cuvette; and
    using a conductivity measurement to determine the conductivity of the measuring medium or using a pH measurement for determining the pH value of the measuring medium.

2. The method of claim 1, wherein the conductivity measurement is carried out as a two-pole conductivity measurement.

3. The method of claim 1, wherein the monitoring of the filling level of the cuvette and the monitoring of the emptying of the cuvette are carried out at the same time as the at least one measuring mode and are used for evaluation of values determined in the at least one measuring mode.

* * * * *